United States Patent
Winkelvos et al.

(10) Patent No.: US 10,204,231 B2
(45) Date of Patent: Feb. 12, 2019

(54) METHOD FOR PROVIDING AN AUTHENTICATED CONNECTION BETWEEN AT LEAST TWO COMMUNICATION PARTNERS

(71) Applicant: VOLKSWAGEN AG, Wolfsburg (DE)

(72) Inventors: Timo Winkelvos, Sickte (DE);
Alexander Tschache, Wolfsburg (DE);
Martin Wuschke, Meine (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 15/660,164

(22) Filed: Jul. 26, 2017

(65) Prior Publication Data
US 2018/0032743 A1 Feb. 1, 2018

(30) Foreign Application Priority Data

Jul. 26, 2016 (DE) .................. 10 2016 213 701

(51) Int. Cl.
*G06F 21/60* (2013.01)
*H04L 29/06* (2006.01)
(Continued)

(52) U.S. Cl.
CPC ........ *G06F 21/606* (2013.01); *H04L 63/0823* (2013.01); *H04L 63/18* (2013.01);
(Continued)

(58) Field of Classification Search
CPC .............................. H04L 67/12; H04W 12/06
See application file for complete search history.

(56) References Cited

U.S. PATENT DOCUMENTS

2006/0015722 A1    1/2006 Rowan et al.
2006/0123226 A1*   6/2006 Kumar ................ H04L 63/0281
                                                    713/154
(Continued)

FOREIGN PATENT DOCUMENTS

DE    102005023544 A1    12/2006
DE    102013201624 A1     7/2014
DE    102014225808 A1     2/2016

OTHER PUBLICATIONS

Search Report for European Patent Application No. 17180651.6; dated Nov. 30, 2017.

*Primary Examiner* — Hsin-Chun Liao
(74) *Attorney, Agent, or Firm* — Barnes & Thornburg LLP

(57) ABSTRACT

A method for providing an authenticated connection between at least two communication partners including implementing a server application on a first communication partner of the at least two communication partners, implementing a first user application on a second communication partner of the at least two communication partners, and carrying out an application-related pairing between the server application on the first communication partner and the first user application on the second communication partner for producing an application-restricted authenticated connection between the first communication partner and the first user application on the second communication partner. The method enables a coupling of at least two communication partners which is effected at the application level and is independent of the protection of the communication connection between the communication partners.

13 Claims, 2 Drawing Sheets

(51) Int. Cl.
*H04L 29/08* (2006.01)
*H04W 12/06* (2009.01)
*H04W 4/48* (2018.01)

(52) U.S. Cl.
CPC ............ *H04L 67/12* (2013.01); *H04W 4/48* (2018.02); *H04W 12/06* (2013.01)

(56) References Cited

U.S. PATENT DOCUMENTS

| | | |
|---|---|---|
| 2011/0210820 A1 | 9/2011 | Talty et al. |
| 2013/0232136 A1* | 9/2013 | Geiger .............. G06F 17/30554 707/722 |
| 2014/0187149 A1 | 7/2014 | Lortz et al. |
| 2014/0196023 A1 | 7/2014 | Bouthillier et al. |
| 2014/0196111 A1 | 7/2014 | Kesavan et al. |
| 2014/0244723 A1* | 8/2014 | Gong ................... H04L 9/3215 709/203 |
| 2015/0339334 A1 | 11/2015 | Hanke |

\* cited by examiner

METHOD FOR PROVIDING AN AUTHENTICATED CONNECTION BETWEEN AT LEAST TWO COMMUNICATION PARTNERS

PRIORITY CLAIM

This patent application claims priority to German Patent Application No. 10 2016 213 701.8, filed 26 Jul. 2016, the disclosure of which is incorporated herein by reference in its entirety.

SUMMARY

Illustrative embodiments relate to a method for providing an authenticated connection between at least two communication partners and to a communication system.

BRIEF DESCRIPTION OF THE DRAWINGS

The disclosed embodiments are explained below with reference to the associated drawings, in which.

DETAILED DESCRIPTION

Figure 1:
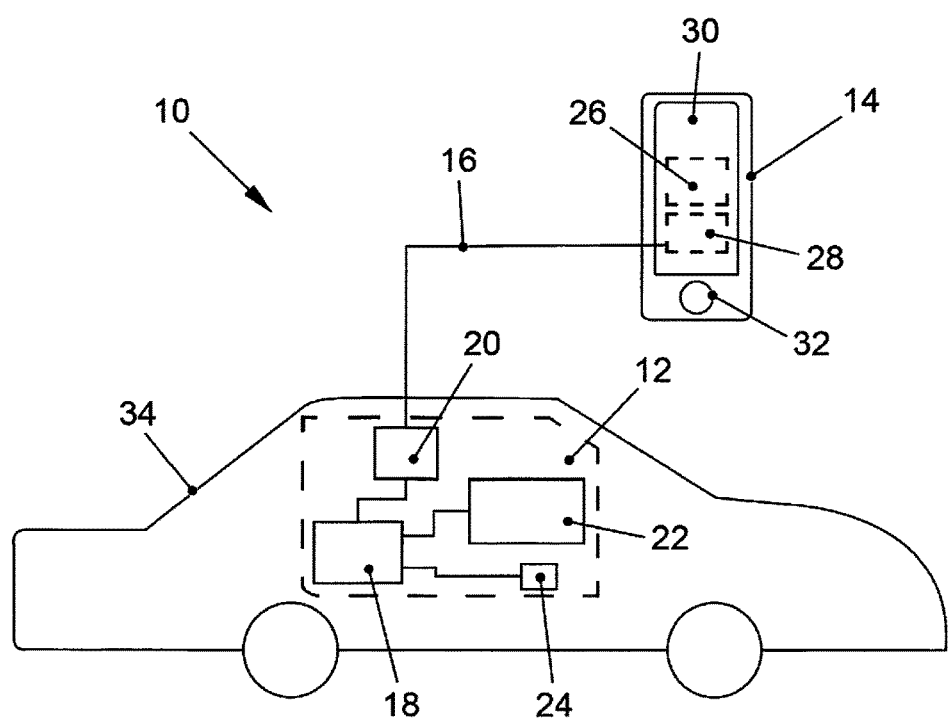
FIG. 1 shows an exemplary embodiment of the communication system in a schematic illustration.

Modern vehicles have infotainment systems which can be coupled to smartphones. By virtue of the coupling, an infotainment system can access media contents, for example, which are stored on the coupled smartphone, to reproduce them in the vehicle.

Moreover, a signal-conducting connection between the vehicle-internal infotainment system and the smartphone can be used to carry out a user identification or to provide application-related user data for the infotainment system.

Since personal data and application-related access data are usually also communicated between the infotainment system and the smartphone, the signal-conducting connection should be equipped with suitable protection. Known solutions are based on the protection of the entire communication connection between the communication partners, such that all applications are dependent on the security of this communication connection.

The document DE 10 2005 023 544 A1 proposes a communication system comprising a vehicle operating unit, a vehicle output unit, an interface computer and a mobile terminal, wherein the interface computer has access protection so the mobile terminal can only access authorized vehicle functions.

To increase the coupling convenience, the document DE 10 2014 225 808 A1 discloses a BLUETOOTH® connection method in which a mobile terminal and an infotainment system of a vehicle are connected. To establish a BLUETOOTH® coupling, a controller arranged in the infotainment system implements an application on the mobile terminal. The information required for the coupling is transmitted to the application by the controller and stored in an NFC (Near Field Communication) Tag by the application.

The document DE 10 2013 201 624 A1 additionally discloses a method for transmitting data from a mobile terminal to a function of a vehicle, in which an operating element is displayed on a touch-sensitive display of the mobile terminal. The operating element comprises an indication that points in the direction in which a reproduction device of the vehicle is situated. The data transmission between the mobile terminal and the reproduction device is activated by the user's swiping in the displayed direction.

In the known solutions, the security of the connection between an infotainment system and a mobile terminal is based on the security of the communication connection. During a connection set-up, only the mobile terminal is identified and, after authentication has been effected, the communication connection between the infotainment system and the mobile terminal is enabled for all applications.

Disclosed embodiments enable a coupling of at least two communication partners which is effected at the application level and is thus independent of the protection of the communication connection between the communication partners.

In the disclosed method for providing an authenticated connection between at least two communication partners, a server application is implemented on a first communication partner of the at least two communication partners and a first user application is implemented on a second communication partner of the at least two communication partners. Moreover, an application-related pairing between the server application on the first communication partner and the first user application on the second communication partner for producing an application-restricted authenticated connection between the first communication partner and the first user application on the second communication partner is carried out.

The disclosed method provides an application-restricted authenticated connection between the first communication partner and the first user application on the second communication partner is produced to protect the end-to-end communication between the communication partners. The security or the protection of the communication path, that is to say of the communication channel between the communication partners, is thus insignificant. By means of the application-restricted authentication of the connection, an application-specific rights configuration can additionally be effected, such that different rights can be allocated for different user applications.

A second user application can be implemented on the second communication partner, such that a further application-related pairing between the server application on the first communication partner and the second user application on the second communication partner for producing an application-restricted authenticated connection between the first communication partner and the second user application on the second communication partner can be carried out. As many user applications as desired can be implemented on the second communication partner, such that an application-related pairing between the server application on the first communication partner and the respective user application on the second communication partner for producing an application-restricted authenticated connection between the first communication partner and the respective user application on the second communication partner can respectively be carried out. Consequently, a plurality or all of the application-related communication connections can be decoupled from the security or the protection of the communication channel used and can be configured in an application-specific manner.

Moreover, first application-related access data can be exchanged between the first user application on the second communication partner and the server application on the first communication partner via the application-restricted authenticated connection between the first communication partner and the first user application on the second communication partner. Alternatively or additionally, second application-related access data can be exchanged between the second user application on the second communication partner and the server application on the first communication partner via the application-restricted authenticated connection between the first communication partner and the second user application on the second communication partner. Furthermore, application-related access data for a plurality or all of the user applications can be exchanged between the respective user application on the second communication partner and the server application on the first communication partner via the application-restricted authenticated connection between the first communication partner and the respective user application on the second communication partner. By exchanging access data, the manual input of access data is partly or completely eliminated and the coupling convenience is thus increased further.

Exchanging application-related access data between a user application on the second communication partner and the server application on the first communication partner can be effected only upon the initial connection set-up between the respective user application on the second communication partner and the first communication partner. After the initial connection set-up, all access data which provide authorization for complete utilization of the user application may be exchanged between the server application on the first communication partner and the user application on the second communication partner. Consequently, upon a renewed connection set-up, the exchange of access data between the server application and the user application can be dispensed with. This leads to an acceleration of device coupling and to an increase in the coupling convenience.

The application-related access data exchanged between a user application on the second communication partner and the server application on the first communication partner can be stored on a memory of the first communication partner. By storing the access data, the data associated with a specific user application are permanently available to the first communication partner and can be retrieved and used as necessary, namely upon a renewed connection set-up.

The second communication partner can be identified by the server application on the first communication partner. Alternatively or additionally, the user application implemented on the second communication partner can be identified by the server application on the first communication partner. The server application on the first communication partner can check whether an application-related pairing between the server application on the first communication partner and the user application on the second communication partner for producing an application-restricted authenticated connection between the first communication partner and the user application on the second communication partner has already taken place. If an application-related pairing between the server application on the first communication partner and the user application on the second communication partner for producing an application-restricted authenticated connection between the first communication partner and the user application on the second communication partner has already taken place, the stored application-related access data can be retrieved from the memory of the first communication partner. The operations designated can be performed automatically and without the need for user action. The coupling process after the initial connection set-up between a user application on the communication partner and the first communication partner is accelerated in this way. Since no user actions are necessary, the coupling convenience is additionally increased.

The respective access data can comprise an application-related user name, an application-related password and/or a certificate. The application-related user name and/or the application-related password can comprise a sequence of letters and/or numbers. The certificate can be a certificate generated and/or issued by the user, a vehicle manufacturer or a certification body. By virtue of the certificate exchange, a further authentication stage can be integrated into the method. By way of example, the exchanged certificate is available to both communication partners, such that an additional authentication can be effected by a certificate matching.

When carrying out the application-related pairing between the server application on the first communication partner and the first user application on the second communication partner for producing an application-restricted authenticated connection between the first communication partner and the first user application on the second communication partner, application-related pairing information can be displayed on the first communication partner and/or application-related pairing information can be displayed on the second communication partner. Alternatively or additionally, carrying out an application-related pairing between the server application on the first communication partner and the first user application on the second communication partner for producing an application-restricted authenticated connection between the first communication partner and the first user application on the second communication partner can comprise confirming the application-related pairing information on the first communication partner by a user and/or confirming the application-related pairing information on the second communication partner by a user. By virtue of the fact that pairing information must be displayed and confirmed by a user, a user action is necessary. The authentication of the connection between the at least two communication partners can be influenced by the user action. This leads to increased security and to generation of trust of the user in the security of the connection between the at least two communication partners.

In the method, the first communication partner can be embodied as a vehicle-internal device. The vehicle-internal device may be embodied as an infotainment system of the vehicle. Alternatively or additionally, in the method, the second communication partner can be embodied as a mobile terminal. The mobile terminal may be embodied as a smartphone. The user applications can comprise applications for reproducing media contents, such as audio contents or video contents. Alternatively or additionally, the user applications can be navigation services or applications of various social networks. The user applications can also relate to other mobile online services.

The disclosed communication system comprises at least two communication partners wherein a server application is installed on a first communication partner of the at least two communication partners and a first user application is installed on a second communication partner of the at least two communication partners. The communication system is configured to the effect that an application-related pairing between the server application on the first communication partner and the first user application on the second communication partner for producing an application-restricted authenticated connection between the first communication partner and the first user application on the second communication partner is carried out if the server application is implemented on the first communication partner and the first user application is implemented on the second communication partner.

In the disclosed communication system, the production of an application-restricted authenticated connection between the first communication partner and the first user application on the second communication partner allows the end-to-end communication between the communication partners to be protected. The security or the protection of the communication path, that is to say of the communication channel between the communication partners, is thus insignificant. By virtue of the fact that the communication system allows an application-restricted authentication of the connection, an application-specific rights configuration can additionally be effected, such that different rights can be allocated for different user applications.

A second user application can be installed on the second communication partner of the communication system, wherein the communication system is configured to the effect that an application-related pairing between the server application on the first communication partner and the second user application on the second communication partner for producing an application-restricted authenticated connection between the first communication partner and the second user application on the second communication partner can be carried out if the server application is implemented on the first communication partner and the second user application is implemented on the second communication partner. As many user applications as desired may be installed on the second communication partner of the communication system, wherein the communication system is configured to the effect that an application-related pairing between the server application on the first communication partner and the respective user application on the second communication partner for producing an application-restricted authenticated connection between the first communication partner and the respective user application on the second communication partner can respectively be carried out if the server application is implemented on the first communication partner and the respective user application is implemented on the second communication partner. Consequently, a plurality or all of the application-related communication connections of the communication system can be decoupled from the security or the protection of the communication channel used and can be configured in an application-specific manner.

The communication system can be configured to exchange application-related access data between a user application on the second communication partner and the server application on the first communication partner via the application-restricted authenticated connection between the first communication partner and the respective user application on the second communication partner, wherein exchanging application-related access data between a user application on the second communication partner and the server application on the first communication partner may be effected only upon the initial connection set-up between the respective user application on the second communication partner and the first communication partner. By exchanging access data, the manual input of access data is partly or completely eliminated and the coupling convenience is thus increased further. The communication system can be configured, after the initial connection set-up, to exchange all access data which provide authorization for complete utilization of the user application between the server application on the first communication partner and the user application on the second communication partner. Consequently, upon a renewed connection set-up, the exchange of access data between the server application and the user application can be dispensed with. This leads to an acceleration of device coupling and to an increase in the coupling convenience.

The first communication partner can comprise a memory, wherein the first communication partner can be configured to store the application-related access data exchanged between a user application on the second communication partner and the server application on the first communication partner on the memory. By storing the access data, the data associated with a specific user application are permanently available to the first communication partner and can be retrieved and used as necessary, namely upon a renewed connection set-up. The first communication partner can be configured to identify the second communication partner and/or the user application implemented on the second communication partner by the server application and to check whether an application-related pairing between the server application on the first communication partner and a user application on the second communication partner for producing an application-restricted authenticated connection between the first communication partner and the user application on the second communication partner has already taken place. The first communication partner can be configured to retrieve stored application-related access data from the memory of the first communication partner if an application-related pairing between the server application on the first communication partner and a user application on the second communication partner for producing an application-restricted authenticated connection between the first communication partner and the user application on the second communication partner has taken place. The communication system can be configured to perform the designated identifying, checking and retrieving automatically and without the need for user action. In this way, the communication system makes it possible that the coupling process after the initial connection set-up between a user application on the second communication partner and the first communication partner can be accelerated. Since no user actions are necessary, the coupling convenience is additionally increased.

The respective access data can comprise an application-related user name, an application-related password and/or a certificate. The first communication partner and the second communication partner can be configured to manage application-related user names and/or application-related passwords which comprise a sequence of letters and/or numbers. The certificate can be a certificate generated and/or issued by the user, a vehicle manufacturer or a certification body. By virtue of the certificate exchange, a further authentication stage can be integrated into the communication system. By way of example, the exchanged certificate is available to both communication partners, such that the additional authentication can be effected by means of a certificate matching.

The first communication partner and/or the second communication partner can be configured to display application-related pairing information to a user. For this purpose, the first communication partner and/or the second communication partner can have in each case a display device. The display device can be embodied as a display or as a touchscreen. The first communication partner and/or the second communication partner can have in each case an actuation device that allows a user to confirm application-related pairing information on the first communication partner and/or the second communication partner. The actuation device can comprise one or a plurality of actuation elements, such as, for example, keys or pushbuttons, or a touchscreen. By virtue of the fact that, in the communication system, pairing information must be displayed and confirmed by a user, a user action is necessary. The authentication of the connection between the at least two communication partners can be influenced by the user action. This leads to increased security.

The first communication partner can be embodied as a vehicle-internal device. The vehicle-internal device may be embodied as an infotainment system of the vehicle. Alternatively or additionally, the second communication partner can be embodied as a mobile terminal. The mobile terminal may be embodied as a smartphone. The user applications can comprise applications for reproducing media contents, such as audio contents or video contents. Alternatively or additionally, the user applications can be navigation services or applications of various social networks. The user applications can also relate to other mobile online services.

The communication system can additionally be configured to perform the method for providing an authenticated connection between at least two communication partners according to at least one of the embodiments described above. The same benefits and modifications as described above are applicable.

The various embodiments mentioned in this application, unless explained otherwise in an individual case, can be combined with one another.

FIG. 1 shows a communication system 10 comprising two communication partners 12, 14. The first communication partner 12 is embodied as a vehicle-internal device of the vehicle 34, wherein the vehicle-internal device is an infotainment system. The second communication partner 14 is embodied as a mobile terminal, wherein the mobile terminal is embodied as a smartphone.

The first communication partner 12 comprises a computing unit 18, a communication module 20, a display device 22 and an actuation device 24. The communication module 20, the display device 22 and the actuation device 24 are connected to the computing unit 18 in a signal-conducting manner. The communication module 20 is configured to communicate with other communication partners wirelessly, for example, by BLUETOOTH®. The display device 22 is embodied as a display and integrated into the dashboard of the vehicle 34. The actuation device 24 comprises a plurality of pressure-sensitive input elements and is integrated into the center console of the vehicle 34.

The second communication partner 14 likewise comprises a computing unit 26, a communication module 28, a display device 30 and an actuation device 32. The communication module 28, the display device 30 and the actuation device 24 are connected to the computing unit 26 in a signal-conducting manner. The communication module 28 is configured to communicate with other communication partners wirelessly, for example, by BLUETOOTH®. The display device 30 is embodied as a touchscreen. The actuation device 32 is embodied as a pushbutton.

A server application is installed on the first communication partner 12 and a plurality of user applications are installed on the second communication partner 14. The communication system 10 is configured to the effect that an application-related pairing between the server application on the first communication partner 12 and the respective user applications on the second communication partner 14 for producing an application-restricted authenticated connection 16 between the first communication partner 12 and the respective user applications on the second communication partner 14 is carried out if the server application is implemented on the first communication partner 12 and the respective user applications are implemented on the second communication partner 14.

The communication system 10 is furthermore configured to exchange application-related access data between a user application on the second communication partner 14 and the server application on the first communication partner 12 via the application-restricted authenticated connection 16 between the first communication partner 12 and the respective user application on the second communication partner 14. In this case, exchanging application-related access data between a user application on the second communication partner 14 and the server application on the first communication partner 12 is effected only on the initial connection set-up between the respective user application on the second communication partner 14 and the first communication partner 12.

Figure 2:
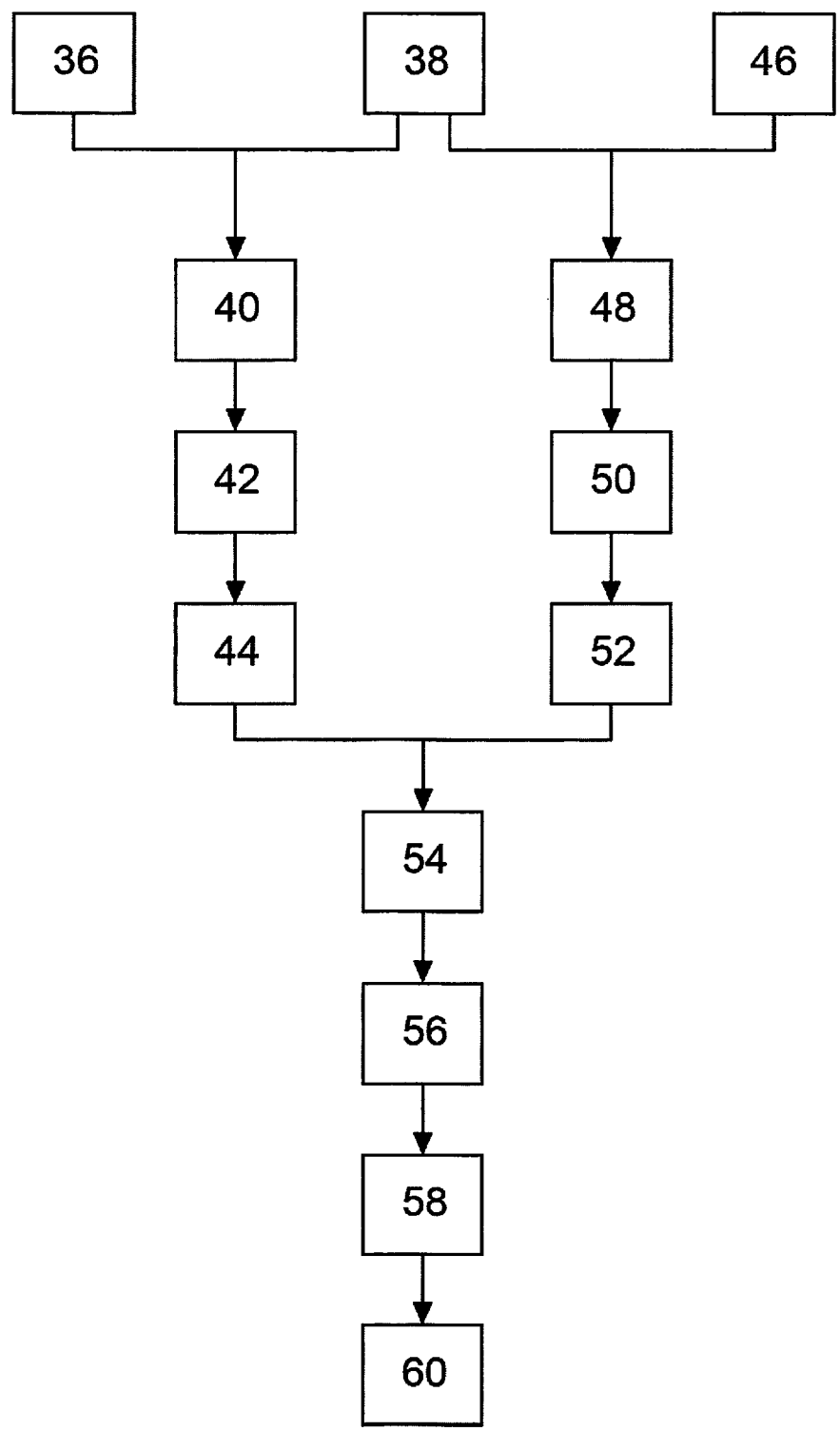
FIG. 2 shows an exemplary embodiment of the method in a schematic flow diagram.

FIG. 2 shows a method for providing an authenticated connection 16 between two communication partners 12, 14, which method begins with the following operations:

36) Implementing a first user application on a second communication partner 14 of the at least two communication partners 12, 14; and 38) Implementing a server application on a first communication partner 12 of the two communication partners 12, 14.

The first user application is a music reproduction application. The first communication partner 12 is embodied as a vehicle-internal device and the second communication partner 14 is embodied as a mobile terminal. So a secure communication between the first communication partner 12 and the second communication partner 14 can be effected, the following operation is performed:

40) Carrying out an application-related pairing between the server application on the first communication partner 12 and the first user application on the second communication partner 14 for producing an application-restricted authenticated connection 16 between the first communication partner 12 and the first user application on the second communication partner 14.

After the application-related pairing between the server application on the first communication partner 12 and the first user application on the second communication partner 14 has been carried out, data can be exchanged between the server application on the first communication partner 12 and the first user application on the second communication partner 14, such that the following operation is performed:

42) Exchanging first application-related access data between the first user application on the second communication partner 14 and the server application on the first communication partner 12 via the application-restricted authenticated connection 16 between the first communication partner 12 and the first user application on the second communication partner 14.

The first access data comprise an application-related user name and an application-related password. Exchanging the application-related access data between the first user application on the second communication partner 14 and the server application on the first communication partner 12 is effected only upon the initial connection set-up between the first user application on the second communication partner 14 and the first communication partner 12. So this data exchange can be dispensed with upon the set-up of subsequent connections, the following operation is carried out:

44) Storing the application-related access data exchanged between the first user application on the second communication partner 14 and the server application on the first communication partner 12 on a memory of the first communication partner 12.

Besides the first user application, which is a music reproduction application, a second user application, with which the user has access to an online social network, is likewise implemented on the second communication partner 14. To that end, the following operation is performed:

46) Implementing a second user application on the second communication partner 14.

So secure communication between the first communication partner 12 and the second communication partner 14 can be effected, the following operation is performed:

48) Carrying out an application-related pairing between the server application on the first communication partner 12 and the second user application on the second communication partner 14 for producing an application-restricted authenticated connection 16 between the first communication partner 12 and the second user application on the second communication partner 14.

After the application-related pairing between the server application on the first communication partner 12 and the second user application on the second communication partner 14 has been carried out, data can be exchanged between the server application on the first communication partner 12 and the second user application on the second communication partner 14, such that the following operation is performed:

50) Exchanging second application-related access data between the second user application on the second communication partner 14 and the server application on the first communication partner 12 via the application-restricted authenticated connection 16 between the first communication partner 12 and the second user application on the second communication partner 14.

The second access data likewise comprise an application-related user name and an application-related password. Exchanging the application-related access data between the second user application on the second communication partner 14 and the server application on the first communication partner 12 is likewise effected only upon the initial connection set-up between the second user application on the second communication partner 14 and the first communication partner 12. So this data exchange can be dispensed with upon the set-up of subsequent connections, the following operation is carried out:

52) Storing the application-related access data exchanged between the second user application on the second communication partner 14 and the server application on the first communication partner 12 on a memory of the first communication partner 12.

After the connection between the first communication partner 12 and the second communication partner 14 has been interrupted, for example, because a user of the second communication partner 14, embodied as a mobile terminal, has left the vehicle 34 in which the first communication partner 12 is installed, an accelerated connection set-up between the first user application on the second communication partner 14 and the server application on the first communication partner 12 and also between the second user application on the second communication partner 14 and the server application on the first communication partner 12 can be effected. To that end, the following operations are performed:

54) Identifying the second communication partner 14 by the server application on the first communication partner 12; and 56) Identifying the first user application and second user application implemented on the second communication partner 14 by the server application on the first communication partner 12.

After the first user application and the second user application on the second communication partner have been identified, the following operations can be carried out for accelerated connection set-up:

58) Checking, by the server application on the first communication partner 12, whether an application-related pairing between the server application on the first communication partner 12 and the first user application and the second user application on the second communication partner 14 for producing an application-restricted authenticated connection 16 between the first communication partner 12 and the respective user application on the second communication partner 14 has already taken place; and 60) Retrieving stored application-related access data from the memory of the first communication partner 12 for producing an application-restricted authenticated connection 16 between the first communication partner 12 and the respective user application on the second communication partner 14.

By virtue of carrying out an application-related pairing between a server application on a first communication partner and a user application on a second communication partner, the disclosed embodiments allow a coupling at the application level, such that the application-limited communication is independent of the protection of the communication channel between the communication partners.

LIST OF REFERENCE SIGNS

10 Communication system
12 First communication partner
14 Second communication partner
16 Connection
18 Computing unit
20 Communication module
22 Display device
24 Actuation device
26 Computing unit
28 Communication module
30 Display device
32 Actuation device
34 Vehicle
36-60 Methodoperations

The invention claimed is:

1. A method for providing an authenticated connection between at least two communication partners, the method comprising:
    implementing a server application on a first communication partner of the at least two communication partners;
    implementing a first user application on a second communication partner of the at least two communication partners;
    carrying out an application-related pairing between the server application on the first communication partner and the first user application on the second communication partner for producing an application-restricted authenticated connection between the first communication partner and the first user application on the second communication partner;
    exchanging first application-related access data between the first user application on the second communication partner and the server application on the first communication partner via the application-restricted authenticated connection between the first communication partner and the first user application on the second communication partner, wherein the first access data comprise a certificate;
implementing an additional user application on the second communication partner; and
carrying out an application-related pairing between the server application on the first communication partner and the additional user application on the second communication partner for producing an application-restricted authenticated connection between the first communication partner and the additional user application on the second communication partner.

2. The method of claim 1, further comprising: exchanging second application-related access data between the additional user application on the second communication partner and the server application on the first communication partner via the application-restricted authenticated connection between the first communication partner and the additional user application on the second communication partner.

3. The method of claim 1, wherein exchanging application-related access data between a user application on the second communication partner and the server application on the first communication partner is effected only upon the initial connection set-up between the respective user application on the second communication partner and the first communication partner.

4. The method of claim 1, further comprising:
storing the application-related access data exchanged between a user application on the second communication partner and the server application on the first communication partner on a memory of the first communication partner.

5. The method of claim 1, further comprising a plurality or all of the following:
identifying the second communication partner by the server application on the first communication partner;
identifying the user application implemented on the second communication partner by the server application on the first communication partner;
checking, by the server application on the first communication partner, whether an application-related pairing between the server application on the first communication partner and a user application on the second communication partner for producing an application-restricted authenticated connection between the first communication partner and the user application on the second communication partner has already taken place; and
retrieving stored application-related access data from the memory of the first communication partner in response to an application-related pairing between the server application on the first communication partner and a user application on the second communication partner for producing an application-restricted authenticated connection between the first communication partner and the user application on the second communication partner has taken place.

6. The method of claim 1, wherein the first access data comprise an application-related user name and/or an application-related password.

7. The method of claim 1, wherein carrying out an application-related pairing between the server application on the first communication partner and the first user application on the second communication partner for producing an application-restricted authenticated connection between the first communication partner and the first user application on the second communication partner, the method further comprising:
displaying application-related pairing information on the first communication partner;
displaying application-related pairing information on the second communication partner;
confirming the application-related pairing information on the first communication partner by a user; and
confirming the application-related pairing information on the second communication partner by a user.

8. The method of claim 1, wherein the first communication partner is a vehicle-internal device and/or the second communication partner is a mobile terminal.

9. A communication system, comprising:
at least two communication partners,
wherein a server application is installed on a first communication partner of the at least two communication partners and a first user application is installed on a second communication partner of the at least two communication partners,
wherein the communication system is configured so an application-related pairing between the server application on the first communication partner and the first user application on the second communication partner for producing an application-restricted authenticated connection between the first communication partner and the first user application on the second communication partner is carried out in response to the server application being implemented on the first communication partner and the first user application being implemented on the second communication partner;
wherein the communication system is configured to exchange first application-related access data between the first user application on the second communication partner and the server application on the first communication partner via the application-restricted authenticated connection between the first communication partner and the first user application on the second communication partner, wherein the first access data comprise a certificate; and
wherein an additional user application is installed on the second communication partner and the communication system is configured so an application-related pairing between the server application on the first communication partner and the additional user application on the second communication partner for producing an application-restricted authenticated connection between the first communication partner and the additional user application on the second communication partner is carried out in response to the server application being implemented on the first communication partner and the additional user application being implemented on the second communication partner.

10. The communication system of claim 9, wherein the communication system is configured to exchange second application-related access data between the additional user application on the second communication partner and the server application on the first communication partner via the application-restricted authenticated connection between the first communication partner and the additional user application on the second communication partner.

11. The communication system of claim 9, wherein the first communication partner comprises a memory, wherein the first communication partner is configured to store the application-related access data exchanged between a user application on the second communication partner and the server application on the first communication partner on the memory.

12. The communication system of claim 9, wherein the first communication partner is a vehicle-internal device and/or the second communication partner is a mobile terminal.

13. The communication system of claim 9, wherein the communication system is configured to perform a method for providing the authenticated connection between the at least two communication partners, the method comprising:
   implementing the server application on a first communication partner of the at least two communication partners;
   implementing the first user application on a second communication partner of the at least two communication partners;
   carrying out the application-related pairing between the server application on the first communication partner and the first user application on the second communication partner for producing the application-restricted authenticated connection between the first communication partner and the first user application on the second communication partner; and
   exchanging first application-related access data between the first user application on the second communication partner and the server application on the first communication partner via the application-restricted authenticated connection between the first communication partner and the first user application on the second communication partner, wherein the first access data comprise the certificate.

* * * * *